United States Patent Office 3,364,118
Patented Jan. 16, 1968

3,364,118
PROTEIN COSMETIC COMPOSITION FOR DE-
CREASING WRINKLES IN HUMAN SKIN
Hartley W. Howard, New Milford, Conn., and Winston
H. Wingerd, Elgin, Rosemarie A. Wallisch, Northbrook,
and Sidney Saperstein, Elgin, Ill., assignors to The
Borden Company, New York, N.Y., a corporation of
New Jersey
No Drawing. Filed Aug. 24, 1965, Ser. No. 482,274
11 Claims. (Cl. 167—90)

ABSTRACT OF THE DISCLOSURE

This invention relates to a cosmetic composition for topical application to the human skin which is particularly useful in smoothing wrinkles of the skin, comprising an aqueous solution of a protein in undenatured condition selected from the group consisting of alpha-lactalbumin, and a mixture of alpha-lactalbumin and beta-lactoglobulin and to the method of decreasing wrinkles in human skin comprising application of said composition to the skin. In a preferred embodiment the composition also includes a non-toxic water soluble bacteriostatic and fungistatic preservative that is nonirritating to the skin and/or a plasticizing agent.

---

The problem of smoothing facial or other wrinkles is one of long standing. Various materials have been proposed and some have been used with a measure of success. One procedure is to spackle, in effect, the wrinkles. In this treatment, a paste like material fills the valleys and then an over makeup conceals the spackling. There have been used also egg albumen, blood serum protein and the like.

These previous treatments have had disadvantages including one or more of the following: A shiny appearance of the dry film on the skin, ineffectiveness, requirement of an over makeup to conceal the applied material or flaking of it from the skin after drying, and use of a relatively costly or unesthetic base such as blood serum protein.

Although the protein from milk, including the non-casein proteins, have been long available in commercial quantities at favorable prices and although the human tolerance for and acceptance of milk proteins is wide spread, there has been heretofore no successful wrinkle smoothing composition based upon them. We have found, in fact, that the milk proteins available on the market and used in supplementing cereal flours, for instance, are not satisfactory as the base component of our cosmetic.

The present invention provides a cosmetic composition using certain proteins derived from milk, to make a cosmetic that is easy to apply, is effective in wrinkle smoothing for several hours when spread in amounts as small as a single drop over a localized area of the skin, requires no over makeup to conceal the resulting film, and is reactivatable, by remoistening, after the film has dried and remained on the skin so long as to suffer loss of effectiveness as a wrinkle smoother.

Briefly stated, the invention comprises the herein described cosmetic and the process of using it. More particularly, the invention comprises a cosmetic including alpha-lactalbumin as base material. The invention in the preferred embodiment comprises said alpha-lactalbumin dissolved to a critical concentration in water and having therein an admixed preservative. In one embodiment, the invention includes a plasticizing agent for its effect on the dried films. In a further modification, the invention includes also admixed beta-lactoglobulin, to increase the effectiveness of the applied and dried film, both the beta-lactoglobulin and the alpha-lactalbumin being the undenatured, i.e., not heat-insolubilized condition as shown by electrophoretic measurements.

All materials used should be of pharmaceutical or cosmetic grade and non-irritating on the skin and non-toxic as used.

The alpha-lactalbumin as used is soluble in water. It is prepared without heating to precipitate it from whey. A satisfactory preparation is made to advantage, by precipitation of the lactalbumin from cow's milk whey by a complex water soluble alkali metal phosphate, centrifugally or otherwise filtering the precipitated combination of the complex phosphate and lactalbumin from the supernatant liquor, then treating said combination with acid, such as sulfuric, to decompose the complex phosphate, and then separating the phosphate and other ions from alpha-lactalbumin. The whole processing is effected at a temperature below that of heat denaturing of the protein, as at ordinary or approximately atmospheric temperatures. The beta-lactoglobulin of the whey associates itself with the alpha-lactalbumin and appears in intimate compounded condition in the final product of the processing described. The preparation may be and suitably is made as described in the examples set forth below.

In a representative preparation, the process was as follows: Cow's milk whey from which the casein had been precipitated, as by hydrochloric acid admixed to a pH of about 4.5, was stirred with a complex alkali metal phosphate in the proportion of 0.5 part for 100 parts of the whey, the pH being established by the addition of hydrochloric acid as may be required, at about 2.5 to 3.5. It was then centrifuged against a filtering cloth, so that the liquor passes through and the precipitated protein-phosphate combination remains behind. This residue may be and suitably is once or twice reslurried with water and recentrifuged, for purification purposes; the pH during such washes being maintained at about 2.5 to 3.5. The residue in the centrifuge is then mixed with aqueous sulfuric acid in amount to establish the pH which will decompose the phosphate complex, as to pH of about 1–1.5. Then most of the phosphate is removed by filtration after neutralization with lime. Other electrolytes and other dialyzable materials were removed by dialyzing the composition against water, using a semi-permeable membrane such as cellophane, by maintaining the composition inside cellophane tubes in a bath of running tap water until the Solu Bridge readings at 20° C. are below 2,000 micromhos and suitably below 1,000. With tubes of 1 inch diameter, this purification is obtained in 5–10 hours, although up to 46 hours have been used. The purification is set forth in greater detail in a copending application by Winston H. Wingerd, Ser. No. 395,562, filing date Sept. 10, 1964, now abandoned, and the continuation-in-part application Ser. No. 486,524, filed Sept. 10, 1965.

The solution then removed from inside the tubes is essentially an aqueous dispersion of alpha-lactalbumin and beta-lactoglobulin. It is ready for low temperature evaporation to concentrate the proteins to the desired degree. It can then be dried for subsequent use or immediately compounded and used.

The beta-lactoglobulin which remains with the alpha-lactalbumin is a benefit when the proportion is within the ranges set forth below. While the beta-lactoglobulin itself is unsatisfactory as a wrinkle smoothing base material, the combination of it with the alpha-lactalbumin is more effective in one regard at least than the alpha-lactalbumin or the beta-lactoglobulin alone when used in the full amount corresponding to that of the total of the two components in the preferred base material. Also, the mixed proteins are less costly to produce than either one separately.

The solvent used in the aqueous solution is water.

To increase the flexibility of the film for easier application and better durability, we incorporate a plasticizing agent. This is ordinarily a water soluble and hydrophilic hydroxy organic compound such as a polyol. The polyol may be one or a mixture of two or more of the following: glycerin; sorbitol; a non-toxic glycol, e.g., propylene, dipropylene or other $C_2$–$C_4$ glycol; polyglycols thereof; or (1) a partial $C_1$–$C_4$ alkyl ether or (2) a partial ester of a $C_2$–$C_5$ monocarboxylic aliphatic acid with glycerin or any one of said glycols. In any case, the compound selected for this purpose must be water soluble and also non-toxic on the human skin of normal sensitivity.

The preservative used is one that is a non-precipitant for the lactalbumin and lactoglobulin and both bacteriostatic and fungistatic, a combination of various conventional preservatives of this type being used when necessary to preserve the product for satisfactory storage and shelf life in aqueous solution form. Examples of preservatives that may be used, alone or mixed, are shown in Table A.

TABLE A

N-(3-chloroallyl)-hexaminium chloride
Methyl-p-hydroxybenzoate
Propyl-p-hydroxybenzoate
6-acetoxy-2, 4-dimethyl-m-dioxane
Hexachlorophene
2,2'-methylene bis-(3,4,6-trichlorophenol)
Formaldehyde, and combinations of two or more thereof Some of the preservatives are not water soluble, and therefore are added to the aqueous protein dispersion in the form of a solution in polyethylene glycol or other suitable solvent.

As to proportions, the base protein material must be present in the amount of at least 10 parts and for most effective use not over about 30 parts in 70–90 parts of water, to make 100 parts total of the protein solution.

Also recommended proportions in the base material are about 1 part of the alpha-lactalbumin for 0.5–5 parts and preferably 1–3 parts of the beta-lactoglobulin.

The plasticizing agent, when used, is in the proportion of about 0.2–5 parts for 100 parts of the aqueous solution and usually about 2–4 parts. In any event, the maximum amount of said agent is less than that which, if employed, would interfere with the other properties of the product and the minimum is that adequate to give any improvement necessary in the film flexibility and invisibility of the dried film of thickness which is to be produced on the skin.

The preservative is used in the proportions that are conventional for preserving proteins by the particular preservative composition selected for use, as in the amount of about 0.1–3% of the weight of the cosmetic solution.

Conventional additives may be introduced for their usual effect and in usual amounts. One example is a defoaming agent of the silicone type, to decrease foaming during compounding and handling of the product.

As to conditions, the pH of the finished cosmetic is approximately within the range 5–7 before application to the skin. This pH is attained during neutralization of the proteins as described in the examples herein.

The cosmetic solution is applied satisfactorily at usual room temperatures, as a drop to the skin to be treated, and then spread with the finger or otherwise over the adjacent area.

If the applied film loses its effectiveness as it may after several hours, the effectivenes can be restored, nearly or completely to the previous level, by moistening the film with a small amount of water, the amount of water used being less than that which would dissolve the materials of the film from their position on the skin but sufficient to soften the film appreciably.

The invention is illustrated further by description in connection with the following specific examples or the practice of it, all proportions here and elsewhere herein being expressed as parts by weight unless specifically stated to the contrary.

*Example 1*

Alpha-lactalbumin was prepared according to the method of W. G. Gordon and J. Ziegler, published in Biochemical Preparations, volume 4, pages 16–23, John Wiley and Sons, 1955. Ten grams of the lyophilized alpha-lactalbumin was dissolved in 100 parts of water adjusted to a pH of 6.6. The following preservatives were added: 0.1 gram N-(3-choroallyl)-hexaminium chloride and 3 grams of a polyethylene glycol solution providing 0.1 gm. hexachlorophene, 0.1 gm. methyl-p-hydroxybenzoate, and 0.4 gm. propyl-p-hydroxybenzoate. This solution was found to have exceptional ease of application and excellent activity in the removal of facial wrinkles. The wrinkle removing activity was maximum in excess of 4 hours. A sample of beta-lactoglobulin prepared according to a procedure given in the above reference and at the same concentration was inactive as a wrinkle removing agent.

*Example 2*

The composition and process of Example 1 was followed except that 3 gms. of glycerin was added to 100 gms. of the alpha-lactalbumin solution. The glycerin serves to make the protein film easier to apply to the skin, more pliable after drying, and longer lasting.

*Example 3*

Lactalbumin phosphate was prepared as described in copending application Ser. No. 395,562 filed by Winston H. Wingerd on Sept. 10, 1964. Twenty-two pounds of the spray dried lactalbumin phosphate was mixed with 200 pounds of water and the pH adjusted to 2.1 with sulfuric acid. The insoluble lactalbumin phosphate was allowed to settle overnight and 160 pounds of the supernatant water was removed by decantation. Seventy-five pounds of deionized water was added to the washed LP, the pH adjusted to 1.5 with sulfuric acid, and the temperature raised to 115° F. The mixture was held at this temperature for four hours and then neutralized with calcium hydroxide to about 5.5. The resulting mixture was filtered and the filtrate condensed under vacuum at 90° F. to 35% solids. The condensed filtrate was placed in cellophane tubes and dialyzed for 48 hours against running water. After dialysis the solution was again condensed under vacuum to contain 20% protein. To this solution was added 0.2% N-(3-chloroallyl)-hexaminium chloride. The solids in this solution contained 92% protein and 2% ash. Electrophoretic separation of the proteins indicate an alpha-lactalbumin to beta-lactoglobulin ratio of about 1 to 4. The solution has excellent activity as a wrinkle smoothing composition; the activity being maximum in excess of 4 hours.

*Example 4*

The composition and process of Example 3 was followed except that 3% of a solution of polyethylene glycol (Carbowax 400) containing 6.6% hexachlorophene, 6.6% methyl-p-hydroxybenzoate, and 1.32% propyl-p-hydroxybenzoate was added to the final cosmetic solution which contains 20% protein. The glycol serves the dual function of placing the preservatives in solution and also acts as a plasticizer for the protein film, making it easier to apply, more flexible, and longer lasting.

*Example 5*

The procedure and composition of Example 2 are used except that the glycerin there introduced is replaced by an equal weight of the following hydroxy, hydrophilic water soluble organic compounds, used separately and in turn: propylene glycol, sorbitol, propylene glycol monoacetate, and glycerin diacetate, and mono $C_1$–$C_3$ alkyl ethers of glycerin, e.g., glycerin monoethyl ether.

Example 6

The protein lotion of Example 4 was applied to the skin about the eyes of thirty-two patients; two specifically chosen because they had milk allergies. Several drops of lotion were applied to the skin and smoothed over the area by finger. The results were then observed.

The application of the lotion was repeated daily, and in some cases twice daily, over an average period of one month. In several cases, the application continued for over one year.

After each use, the skin was smooth and there was no irritation or sensitization. The skin-smoothing effect lasted for an average of four hours, and on several occasions the effect was prolonged by remoistening the dried film with a drop or two of water.

After the prolonged use noted above, there was no indication of irritation or sensitization.

It will be understood that it is intended to cover all changes and modifications of the examples of the invention herein chosen for the purpose of illustration which do not construe departures from the spirit and scope of the invention.

We claim:

1. A cosmetic composition for topical application to human skin comprising an aqueous solution of alpha-lactalbumin in undenatured condition and a non-toxic and non-irritating on the skin, water soluble, bacteriostatic and fungistatic preservative therefore that is a non-precipitant for the lactalbumin and is present in an amount sufficient to preserve the lactalbumin, the pH of said composition being approximately within the range 5–7 and the proportion of lactalbumin present being at least about 10 parts by weight for 70–90 parts of water in said solution.

2. A cosmetic composition for topical application to human skin comprising an aqueous solution of water soluble alpha-lactalbumin and beta-lactoglobulin in undenatured condition, the proportions by weight being about 1 part of the alpha-lactalbumin for 0.5–5 parts of the beta-lactoglobulin and 10–30 parts total of lactalbumin and lactoglobulin for 70–90 parts of water in said solution.

3. The composition of claim 1, said preservative being selected from the group consisting of N-(3-chloroallyl)-hexaminium chloride; methyl-p-hydroxy and propyl-benzoate; 6-acetoxy-2, 4-dimethyl m-dioxane; hexachlorophene; 2,2′-methylene bis-(3,4,6-trichlorophenol), formaldehyde, and combinations thereof.

4. The composition of claim 2, including a plasticizing agent, said agent being selected from the group consisting of glycerin; sorbitol; water soluble $C_2$–$C_4$ glycols and polyglycols thereof; water soluble partial $C_2$–$C_4$ alkyl ethers of glycerin and said glycols; water soluble partial esters of $C_2$–$C_5$ monocarboxylic aliphatic acids with glycerin and said glycols; and mixtures thereof and being in the proportion of about 0.2–5 parts for 100 parts of said solution.

5. The composition of claim 2, including admixed and dissolved propylene glycol in the proportion of about 0.2–5 parts for 100 parts of said solution.

6. A wrinkle-smoothing cosmetic composition for application to human skin wherein the skin-smoothing effect lasts for an average of four hours, comprising an aqueous solution of alpha-lactalbumin in undenatured condition, a non-toxic and non-irritating on the skin, water-soluble preservative therefor that is a non-precipitant for the lactalbumin, and is present in an amount sufficient to preserve the alpha-lactalbumin and glycerin, proportions by weight being at least about 10 parts of lactalbumin for 70–90 parts of water in said solution and from about 0.2–5 parts glycerin for 100 parts of said solution.

7. A wrinkle-smoothing cosmetic composition wherein the skin-smoothing effect lasts for an average of four hours, comprising an aqueous solution of undenatured alpha-lactalbumin and beta-lactoglobulin, a non-toxic and non-irritating on the skin, water soluble preservative therefor that is a non-precipitant for the alpha-lactalbumin and beta-lactoglobulin and is present in an amount sufficient to preserve the lactalbumin and lactoglobulin, and glycerin, proportions by weight being approximately within the range 0.2–5 parts of glycerin for 100 parts of said glycerin, 10–30 parts total of alpha-lactalbumin and beta-lactoglobulin for 70–90 parts of water in said solution, and 0.5–3 parts of the beta-lactoglobulin for 1 part of the alpha-lactalbumin.

8. A cosmetic composition for topical application to human skin comprising water soluble alpha-lactalbumin and beta-lactoglobulin in undenatured condition, the proportions by weight being about 1 part of the lactalbumin for 0.5–5 parts of the lactoglobulin and an admixed non-toxic and non-irritating on the skin, water soluble, bacteriostatic and fungistatic material that is a non-precipitant for said lactalbumin and lactoglobulin and is present in an amount sufficient to preserve said lactalbumin and lactoglobulin.

9. The process of decreasing wrinkles in human skin for an average of four hours which comprises applying to the skin a film of an aqueous solution of alpha-lactalbumin in undenatured condition and being in the proportion of at least about 10 parts by weight for 70–90 parts by weight of water in said solution and a non-toxic and non-irritating on the skin, water soluble bacteriostatic and fungistatic preservative therefor that is a non-precipitant for the alpha-lactalbumin and is present in an amount sufficient to preserve the alpha-lactalbumin, the pH of said solution being approximately within the range 5–7 and maintaining the film on the skin until the film air dries and adheres to the skin.

10. The process of decreasing wrinkles in human skin for an average of four hours which comprises applying to the skin a film of an aqueous solution of alpha-lactalbumin and beta-lactoglobulin in the proportion of about 1 part by weight of the former to 4 parts of the latter and in total proportion of about 10–30 parts by weight for 70–90 parts of water in said solution, a non-toxic and non-irritating on the skin, water soluble bacteriostatic and fungistatic preservative therefor that is a non-precipitant for the lactalbumin and lactoglobulin and is present in an amount sufficient to preserve the lactalbumin and lactoglobulin, the pH of said solution being approximately within the range 5–7, and maintaining the film on the skin until the film air dries and adheres to the skin.

11. The process of claim 10, which includes remoistening the dried film, to reactivate it as a wrinkle smoothing cosmetic, after the film has remained on the wrinkles until losing effectiveness in wrinkle smoothing, the amount of water used in the remoistening being that causing appreciable softening of the film without removing the materials therein from the skin.

References Cited

UNITED STATES PATENTS

| | | |
|---|---|---|
| 2,489,880 | 11/1949 | Hand et al. |
| 2,796,378 | 6/1957 | Ferguson _____ 167—58 |
| 2,937,974 | 5/1960 | Ferguson _____ 167—58 |
| 3,061,512 | 10/1962 | Anderson et al. _____ 167—58 |

ALBERT T. MEYERS, *Primary Examiner.*

D. R. MAHANAND, *Assistant Examiner.*

UNITED STATES PATENT OFFICE
CERTIFICATE OF CORRECTION

Patent No. 3,364,118            January 16, 1968

Hartley W. Howard et al.

It is hereby certified that error appears in the above numbered patent requiring correction and that the said Letters Patent should read as corrected below.

Column 6, line 13, for "glycerin," read -- solution, --.

Signed and sealed this 29th day of April 1969.

(SEAL)
Attest:

Edward M. Fletcher, Jr.
Attesting Officer

EDWARD J. BRENNER
Commissioner of Patents